United States Patent [19]

Liebson

[11] Patent Number: 4,950,896

[45] Date of Patent: Aug. 21, 1990

[54] MODIFIED FORWARD LOOKING IR DEVICE TO INCLUDE WIDE ANGLE BLACK HOLE RADIOMETER

[75] Inventor: Wilbur Liebson, Springfield, Va.

[73] Assignee: The United States of America as represented by the Secretary of the Army, Washington, D.C.

[21] Appl. No.: 926,977

[22] Filed: Jul. 18, 1978

[51] Int. Cl.[5] ........................ G02B 26/10; H01L 25/00

[52] U.S. Cl. .................................... 250/334; 250/332; 250/347

[58] Field of Search ................ 358/113; 250/332–334, 250/339, 342, 346, 347, 341, 352, 213 VT

[56] References Cited

U.S. PATENT DOCUMENTS

| | | | |
|---|---|---|---|
| 3,704,342 | 11/1972 | Stoodard et al. | 358/113 |
| 3,876,308 | 4/1975 | Alpers | 356/152 |
| 3,920,994 | 11/1975 | Cargille | 250/347 |
| 3,944,730 | 3/1976 | Dahlqvist et al. | 358/113 |
| 3,971,886 | 7/1976 | Chow | 358/113 |
| 4,091,414 | 5/1978 | Chow | 358/113 |

*Primary Examiner*—Stephen C. Buczinski

*Attorney, Agent, or Firm*—Milton W. Lee; Max L. Harwell; Anthony T. Lane

[57] ABSTRACT

An electrooptic support measure comprised of black hole radiometer within a forward looking infrared (FLIR) scanning imaging video processing system to provide friendly military personnel with the capability of surveying terrain to determine if enemy thermal imaging devices (TIDs), which have cryogenic temperature detectors therein, are being used in surveillance against the friendly military personnel. The lens and scanners of the FLIR scanning imaging video processing system have wide field of view (FOV) for search operation, and each of the plurality of the IR detectors that form an IR detector array operate as a plurality of radiometers having narrow (FOVs) when the black hole radiometer capability circuit of this disclosure is being used. The black hole radiometer (BHR) mode may be selectively activated in the FLIR scanning imaging video processing system by manual operation of a selector switch, or the FLIR and BHR modes may be automatically sequenced to a preprogrammed schedule in a logic circuit wherein the BHR mode may be switched in on say every second or fifth video channel to provide continual switching back and forth between the FLIR and BHR modes at an image display.

7 Claims, 1 Drawing Sheet

MODIFIED FORWARD LOOKING IR DEVICE TO INCLUDE WIDE ANGLE BLACK HOLE RADIOMETER

The invention described herein may be manufactured, used, and licensed by the U.S. Government for governmental purposes without the payment of any royalties thereon.

CROSS-REFERENCED PATENT

The application is related to U.S. Patent Number 4,091,414 entitled "Forward Looking Infrared Video Processing System Having a Scene Dynamic Range Expander" and U.S. Patent Number 3,971,386 entitled "Method of Controlling a Reference Temperature to Restore DC Level For a Thermal Imaging System," both by inventor Sen-Te Chow and commonly assigned as the present application is to the U.S. Army.

BACKGROUND OF THE INVENTION

The present invention is in the field of modifying present day thermal imaging devices to provide black hole radiometer capability therein so that friendly personnel are provided the needed function of surveying terrain to determine if enemy TIDs are being used against the friendly personnel.

One of the problems is that present day BHRs have a very narrow FOV, of say 2 milliradians or less. For the BHR to have search capability for first acquiring the enemy TIDs, the FOV should be about 4° or larger. Another problem of present day military TIDs is that they do not have the capability to enhance viewing of the scene to acquire enemy TIDs employed in search of our troops. The present modification of the TID FLIRs to include BHR capabilities overcomes the above problems and provides positive identification of enemy TIDs and may even tell what the enemy intentions are at the time of location, such as battle preparation as opposed to their gathering intelligence against us.

SUMMARY OF THE INVENTION

The present invention is comprised of the addition of a black hole radiometer capability circuit to a FLIR scanning imaging common module device video processing system to locate enemy users of thermal imaging devices having cryogenically cooled detectors therein. The BHR capability circuit is comprised of either a manually operated selector switch for switching the BHR mode of operation into the video channels for the present day military FLIR scanning thermal imaging system or a preprogrammed switching schedule built in a logic circuit for automatic sequencing between FLIR and BHR modes. When the selector switch is in the FLIR mode the FLIR scanning imaging system will operate in the manner as taught in the above mentioned U.S. Pat. Nos. 3,971,886 and 4,091,414. However, when the soldier switches the selector switch to the BHR mode of operation, each of a plurality of preamplifiers in the separate video channels now has a comparator reference level signal applied at a second input terminal thereto for comparison with the detector video signals from each of a plurality of detectors in an IR detector array. The selector switch in the BHR mode simultaneously switches in a logic circuit that tells the signal processor circuit of the TID FLIR scanning imaging system that the device is now operating in the BHR mode, i.e. it is now searching for radiation images that are colder than ambient temperature rather than searching for radiation images that are hotter than ambient temperature as would be the case when operating in the FLIR mode. The comparator reference level signal represents a temperature that is preferably just below ambient temperature so that any radiation coming from a cryogenically cooled detector used by enemy TIDs will indicate a much lower temperature than the comparator reference level signal. Both signals are applied to a preamplifier to be processed and be presented on an image display.

The TID first acquires the cryogenic target by use of the wide FOV optics, of about 4° FOV, in the afocal lens assembly and a scanner that scans the scene radiation over the detectors, whereas the BHR operation uses each detector of the detector array to operate as a plurality of narrow FOV black hole radiometers, of about 2 milliradians or less, to take a closer look at the target that has been acquired by the TID when in the search, or FLIR, mode. The FOV of the TID may vary around the 4° by changing the focal length of the afocal lens assembly. The FOV for the BHR operation may also comprise changing the afocal lens assembly to a longer focal length whereupon a close look at a specific target may be obtained.

The circuitry for the BHR mode may also be preprogrammed in the logic circuit such that the BHR capability circuit is automatic. Since the FLIRs display a complete image approximately every 1/30th of a second the BHR mode may be activated for example every other frame or every fifth frame with the device operating in the FLIR mode during the other frames. This sequence is continuous throughout the operation of the device and would result in almost continuous FLIR imaging and still provide BHR capability. In other words, the practical aspect of the BHR usage need not render the FLIR processing inoperative.

IN THE DRAWINGS

FIG. 1 illustrates in block diagram a common modular video channel with the present black hole radiometer capability circuit; and FIG. 2 represents schematically the video signal levels from three detectors in reference to the comparator reference level signal as applied to preamplifiers.

DESCRIPTION OF PREFERRED EMBODIMENT

Figures 1, 2:
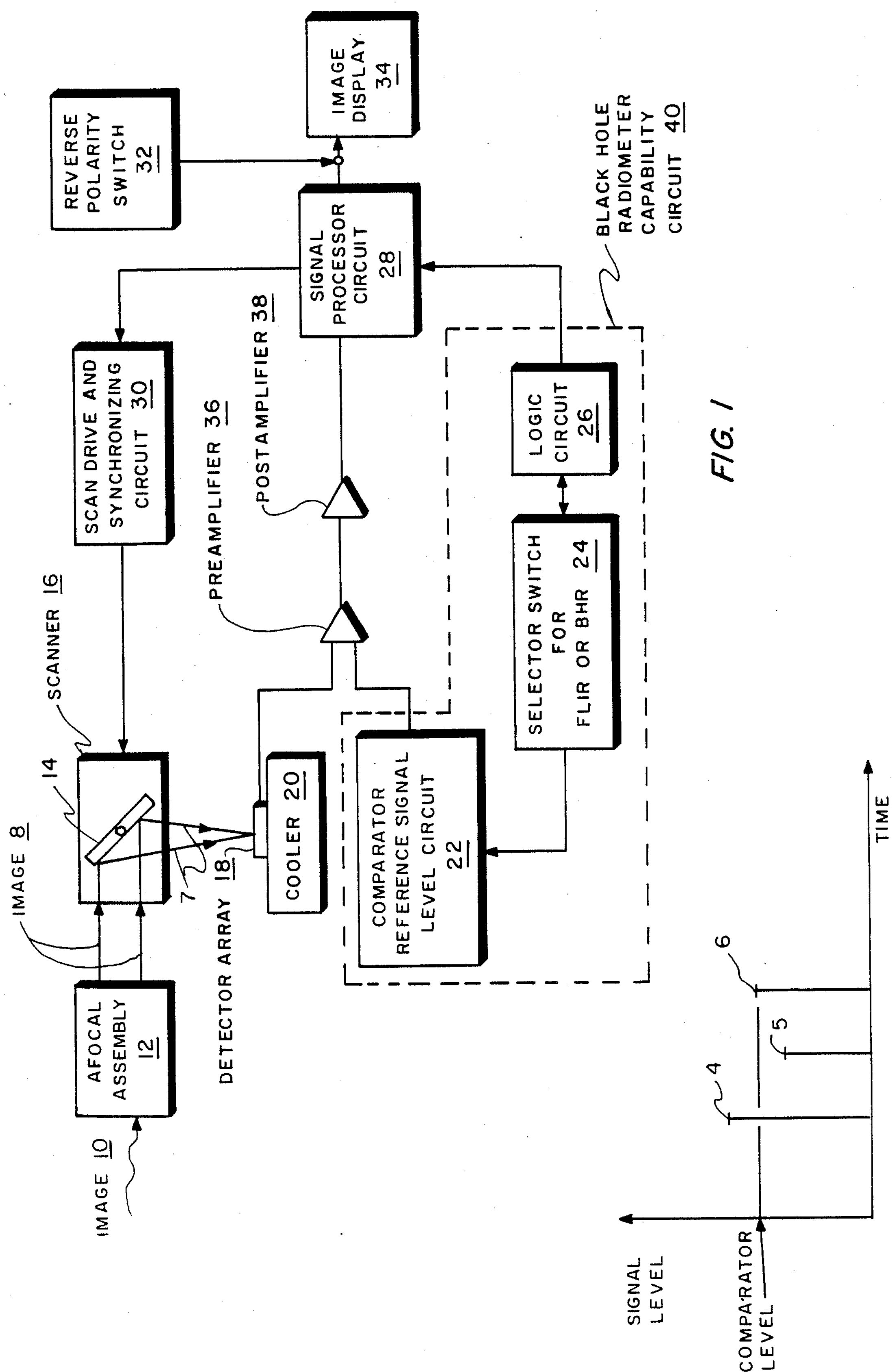

Refer now to FIGS. 1 and 2 for a discussion of how the black hole capability circuit 40 operates in conjunction with the video channels of the FLIR scanning imaging video processing system. There are generally 180 of these video channels in the present FLIR system. Circuit 40 is comprised of a logic circuit 26 that operates in conjunction with a BHR comparator reference signal level circuit 22 by some selector means, such as by manual operation of manual selector switch 24 when operated in the manual, mode or as preprogrammed in logic circuit 26 for the automatic mode. Whether operated in the manual mode or in the preprogrammed mode, circuit 40 may be a small circuit board chip or a plurality of chips that have been preprogrammed, to tell a selected number of the signal processor circuits 28 of the video channels that the device is now operating in the BHR mode and to provide comparator reference signal level signals to the same selected number of preamplifiers now operating in the BHR modes. The comparator reference signal level circuit is applying a signal, which may be cooler than ambient or close thereto, to the same selected number of the plurality of preamplifiers 36 at a second input thereto. The preamplifier outputs are amplified by a plurality of postamplifiers 38. The electrical signals generated at the outputs from each detector in an IR detector array 18 are applied to the first inputs of preamplifiers 36. Thus, the regular output video signals from detector array 18, after being swept by radiation image 10 from a scene being searched, are compared in the selected number of preamplifiers 36 to provide BHR video signals therefrom. Afocal lens 12, having a variable focal length, and mechanical scanner 16, having a flat faced tiltable oscillating reflecting mirror 14 therein, provide a FOV of the scene that may be varied according to the need. Scanner 16 is preferably a two-axis gimbal and housing assembly. The inner gimbal is comprised of mirror 14 while the outer gimbal is tiltable, preferably by solenoids receiving signals from a scan drive and synchronizing circuit 30. Circuit 30 not only may tilt the outer gimbal, and thus the mirror 14 on the inner gimbal, but it synchronizes the frequency of sweep with the processing of the video signals in the signal processor circuit 28 that are derived from the radiation image 10 sweep that is reflected off the reflective face of mirror 14 onto detector array 18. The tiltable feature of the scanner mirror 14 may be used to isolate a small area of the scene to be more closely looked at by oscillating the mirror only over a small area from which a cold spot returned radiation is emanated. Numeral 8 represents the collimated image from the afocal lens assembly 12, and numeral 7 represents the image beams swept across the detector array 18. Afocal lens assembly 12 may have FOV switching means, along with the focus and collimating features, to provide better search procedures. The FOV switching means of assembly 12 may provide a longer focal length for a much closer look by the detectors. The detector array is mounted on a cold finger of cooler 20. Cooler 20 is preferably a Stirling cycle cooler with the cold finger remote from the compressor to avoid vibration of the detectors. An infrared optical imager may be placed between mirror 14 and detector array 18 to cause image beams 7 to converge from mirror 14 to the detector array 18. The detectors are preferably a mercury-cadmium-telluride (HgCdTe) array of 180 elements that are sensitive in the 7.5 to 12 uM spectral region. The detectors may be biased in groups of five, as shown in U.S. Pat. No. 3,971,886.

The image display 34 may be comprised of a plurality of electronic drivers and an array of light emitting diodes (LEDs). The LED array performs the function of converting electronic video signals, produced by the FLIR and BHR modes corresponding to the IR signal produced in the 180 video channels, into visible light at 6000 Å. The LED array may be made of 180 gallium-arsenide-phosphoride (GaAsP) diodes that are arranged in a format matching the IR detector array 18. A reverse polarity switch 32 may be included in the processing system after the signal processor circuit 28 and prior to the image display 34. Switch 32 functions to change the black areas of the display to white and white areas to black as preferred.

FIG. 2 illustrates representative signal levels 4, 5, and 6 from three detectors in the IR detector array 18 in comparison with comparator reference signal levels from circuit 22 in the BHR capability circuit 40. Signal level 4 indicates that it is hotter than the comparator level reference temperature signal. Signal level 5 is colder and signal level 6 is at the same temperature as the comparator level, both of whose signals will be processed and displayed on image display 34 when the present device is operating in the BHR mode. It should be noted that enemy TIDs may have detectors cooled at temperatures of 26° Kelvin as opposed to 77° Kelvin. However, even if the enemy detectors are at 26° Kelvin the comparison reference signal level need only be at ambient. Any colder signal than ambient will then be displayed in the BHR mode regardless of its exact temperature.

While there has been shown and described what is considered the preferred embodiment, it will be apparent to those skilled in the art that various modifications may be made therein without departing from the scope of the invention as defined by the appended claims.

I claim:

1. A means for providing black hole radiometer capability in the video channels of a forward looking IR scanning imaging common module device, the device comprising:

a scanner having a tiltable oscillating reflecting mirror for providing a wide field of view of the scene being viewed;

an afocal lens assembly for viewing a radiation image from said scene and projecting said radiation image on said tiltable oscillating reflecting mirror;

an IR detector array in thermal contact with a thermal cooler cold finger, said IR detector array being swept by said radiation image reflected off said mirror in a plurality of narrow field of views for each detector in said IR detector array and wherein an electrical signal is generated at the output of each of the detectors in said detector array;

a black hole radiometer capability circuit integrated into said forward looking IR scanning imaging common module, said black hole radiometer capability circuit having a logic circuit with a preprogrammed schedule built therein for selectively activating a selected number of video channels of the forward looking IR mode of operation into the black hole radiometer capability circuit mode of operation and a comparator reference signal level circuit and a selector switch that switches said selected number of video channels from forward looking IR scanning imaging module video processing to the black hole radiometer reference temperature signal level mode of operation for said logic circuit and said comparator reference signal level circuit;

a plurality of preamplifiers having an IR electrical signal at a first input thereto from the output of one each of said detectors in said IR detector array when operating in the forward looking IR mode and having additionally a second input thereto from the output of said comparator reference signal level circuit only when said device is operating in the black hole radiometer mode wherein said plurality of preamplifiers selectively provides amplified electronic video signals therefrom in the forward looking IR scanning imaging and in the black hole radiometer modes when said black hole radiometer mode is selectively switched into said second input of said plurality of preamplifiers;

a plurality of postamplifiers that further amplifies said electronic video signals;

a signal processor circuit for processing the amplified electronic video signals into a visible image display, said logic circuit providing information to tell said signal processor circuit that said selected number of video channels are operating in the black hole radiometer mode; and a scan drive and synchronizing circuit that is controlled by said signal processor circuit to synchronize the scan of said scanner tiltable oscillating reflecting mirror with the processing of said electronic video signals in said signal processor circuit.

2. A device as set forth in claim 1 wherein said tiltable oscillating reflecting mirror is a flat faced mirror and said afocal lens assembly collimates said radiation image at the flat face of said flat faced mirror.

3. A device as set forth in claim 2 wherein the black hole radiometer reference temperature signal level mode within said comparator reference signal level circuit is operating at a signal level that represents a temperature reference slightly less than ambient wherein the comparator signals at said second input to a selected number of said preamplifiers is compared with said electrical signal representing cryogenic temperature targets at the output of each of the detectors in said detector array to provide amplified video signals of said cryogenic temperature targets.

4. A device as set forth in claim 3 wherein said selector switch is manually activated.

5. A device as set forth in claim 3 wherein said selector switch is preprogrammed into said logic circuit as a switching schedule and sequences automatically between the forward looking IR scanning imaging video processing mode and the black hole radiometer reference temperature signal level mode of operation in said selected number of video channels.

6. A device as set forth in claim 5 wherein said selected number of video channels is every second video channel.

7. A device as set forth in claim 5 wherein said selected number of video channels is every fifth video channel.

* * * * *